UNITED STATES PATENT OFFICE.

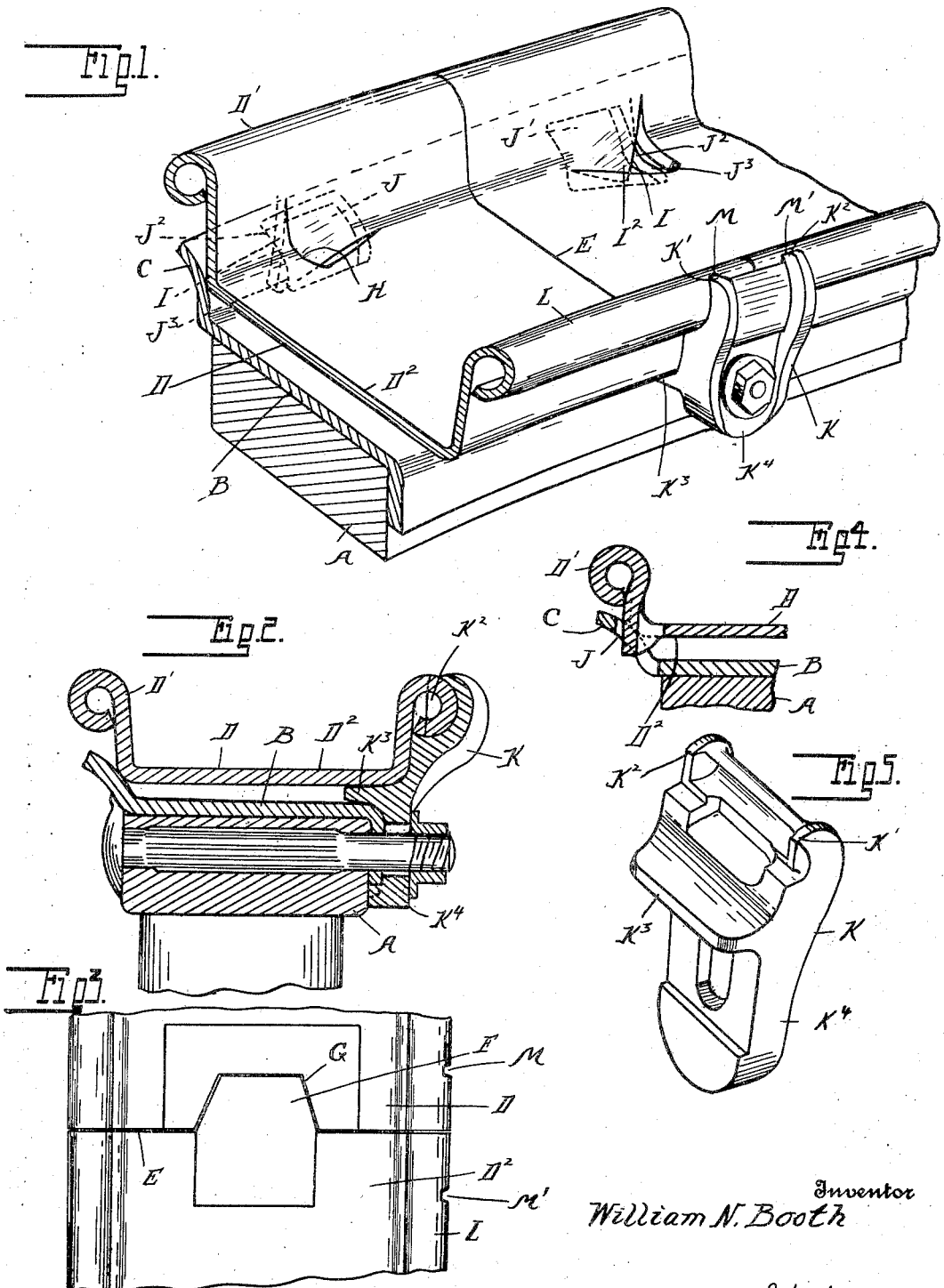

WILLIAM N. BOOTH, OF DETROIT, MICHIGAN, ASSIGNOR TO KELSEY WHEEL COMPANY, INC., OF DETROIT, MICHIGAN, A CORPORATION OF NEW YORK.

VEHICLE-WHEEL RIM.

1,368,235.  Specification of Letters Patent.  Patented Feb. 15, 1921.

Application filed July 29, 1916, Serial No. 112,057. Renewed September 10, 1919. Serial No. 322,982.

*To all whom it may concern:*

Be it known that I, WILLIAM N. BOOTH, a citizen of the United States of America, residing at Detroit, in the county of Wayne and State of Michigan, have invented certain new and useful Improvements in Vehicle-Wheel Rims, of which the following is a specification, reference being had therein to the accompanying drawings.

The invention relates to vehicle wheel rims designed for use as demountable rims, and has particular reference to that type in which the rims are split transversely to permit of collapsing in diameter for engagement with the tire casings. Rims of this character are detachably secured to the felly rim of the wheel in various ways, as by clamping or clamping and wedging; usually the felly band is provided with a flange on its inner side upon which one edge of the demountable rim seats, and clamping lugs upon the opposite side serve to retain the rim against this seat. If, in addition to clamping, there is a wedging action of the lugs, a tension will be placed upon the split rim, which will tend to separate the ends thereof, and it is one of the objects of the present invention to provide means for preventing such separation. On the other hand, if the rim is secured by merely clamping its outer edge, there will nevertheless be a tendency for it to be forced upward upon the inclined seat of the felly body flange, which will separate or tend to separate the ends of the demountable rim upon that side of the wheel. Another feature of my invention is the means employed for preventing such separation and the invention further comprises various novel features as hereinafter set forth.

In the drawings:

Figure 1 is a perspective view of a portion of the vehicle wheel and demountable rim;

Fig. 2 is a cross section thereof;

Fig. 3 is a bottom plan view of the adjoining portions of the demountable rim;

Fig. 4 is a cross section showing the engagement between the demountable and fixed rims; and Fig. 5 is a perspective view of the clamping lug.

A is the wheel felly, and B the felly rim mounted thereon, which is provided with the flange C at the inner side thereof inclining upward and outward to form a seat for one edge of the demountable rim D. This rim is transversely split at E and the engaging ends thereof on opposite sides of the split are preferably provided with alining means, such as the tapering lug F on the one engaging a corresponding tapering recess G in the other.

When the demountable rim is first placed upon the felly rim the ends will be held together by the tire, but if the rim were wedged upward upon the inclined seat C, these ends might be forced apart. To prevent such a result I have provided interlocking shoulders on each end of the split rim and upon the flange at one side thereof, engaging coöperating shoulders formed on the seat flange C. Preferably the shoulders on the demountable rim are formed by shearing the metal of the side flange $D'$ of the demountable rim D along the line H and striking the metal outward to form a square shoulder I. The flange C is also apertured at J and $J'$ to receive the struck-out portions I and to provide an opposed shoulder $J^2$, preventing longitudinal movement. Thus when tension is placed upon the demountable rim by wedging it tightly upon the seat flange C, the engagement of the shoulders I with the shoulders $J^2$ will prevent any separation of the rim ends. To facilitate the initial engagement of the shoulders I with the apertures J and $J'$, the latter are so fashioned as to form an enlarged entrance slot with inclined edge portions $J^3$ which guide the shoulders I into engagement with the shoulders $J^2$. These entrance slots are in a portion of the flange C which is of lesser diameter than the inside diameter of the rim D, and therefore to effect initial engagement the struck-out portion is also deflected downward, preferably by shearing slightly into the bottom portion $D^2$ of the demountable rim and striking that portion downward. Thus the portions of the coöperating shoulders I and J² which are in final engagement with each other when expansive force is placed upon the rim will be parallel to each other and transverse to the rim, so as to effectively resist expansion. The inclined guide portion J³ initially engaged by the downwardly-extending portion I² will have been passed by the latter and the square shouldered portions engaged.

The construction as thus far described is all that is required to hold the ends of the split rim from separation if said rim is secured to the felly merely by clamping and without any wedging action along the outer edge. If, on the other hand, wedge clamping lugs are employed for holding the rim in position, this will exert an expensive force on the outer edge of the rim which will not be successfully resisted by the engagement of the shoulders I' and J². Such a result, I have prevented by arranging one of the wedge lugs K so as to overlap the split in the outer edge of the rim, and have provided this lug with locking shoulders for engaging coöperating shoulders in the outer flange of the demountable rim. As shown, the beaded portion L of the outer demountable rim flange is notched at M and M' on opposite sides of the split, and the lug K is formed with projecting portions K' and K² for engaging said notches. The lug K is also provided with the usual wedge portion K³ for bearing against the under face of the rim D, and with an apertured downwardly-extending portion K⁴ which engages the clamping bolt.

With the construction last described, when the demountable rim is in position and ready to be clamped and wedged, the lug K which registers with the split in the rim is tightened and by forcing the projections K' and K² into the notches M and M'' will lock the outer edge portions of the demountable rim from separation at the split. The other wedge lugs may then be tightened to clamp the demountable rim firmly upon the wheel, but this action can have no effect in separating the ends of the rim, as these are locked on both the inside and outside edges thereof.

What I claim as my invention is:

1. The combination with a transversely-split demountable rim having a tire-retaining flange at the side thereof, of portions struck out from said flange to form opposed shoulders on opposite sides of the split, and a felly member having a seat for said rim, provided with coöperating shoulders for engaging and locking said opposed shoulders from separation.

2. The combination with a transversely-split demountable rim having a tire-retaining flange on its inner edge, of a felly band provided with an inclined flange forming a seat for the inner side of said demountable rim, struck-out lugs on the flange of said demountable rim upon opposite sides of the split therein forming opposed shoulders, and coöperating shoulders on the seat flange of the felly band formed by cutting away portions thereof.

3. The combination with a transversely-split demountable rim having a tire-retaining flange on its inner side, of a felly band provided on its inner side with an inclined flange forming a seat for said demountable rim, said band being provided with cutaway portions on opposite sides of the split in the demountable rim, and opposed shoulders on said demountable rim on opposite sides of the split thereof formed by portions struck outward from said tire-retaining flange, said shoulders being adapted to engage the apertures in said seat flange and to interlock with opposed shoulders formed by the edges thereof.

4. The combination with a transversely-split demountable rim having a tire-retaining flange at the inner side thereof, of a felly band provided with an inclined flange on its inner edge forming a seat for said demountable rim, said flange being cut away to form opposed shoulders on opposite sides of the split in the demountable rim and inside of the seat bearing therefor, said cut-away portions being enlarged inside of said seat bearing to form entrance slots with inclined edge flanges, and opposed shoulders struck out from the flange of the demountable rim for interlocking with the opposed shoulders formed by the edges of said apertures, said struck-out portions having downward extensions which initially engage the enlarged entrance slots in said seat flange to guide the coöperating shoulders into engagement.

5. The combination with a transversely-split demountable rim having tire-retaining flanges on its inner and outer edges, of a felly band having an inclined flange forming a seat for the inner edge of said demountable rim, wedge clamping lugs for the outer edge of said demountable rim, interlocking shoulders formed on the inner tire flange of said demountable rim and upon said felly band seat flange on opposite sides of the split in the demountable rim, and interlocking shoulders formed on the outer edge of said demountable rim on opposite sides of the split and in one of the clamping lugs.

6. The combination with a transversely-split demountable rim having struck out portions on opposite sides of the split forming opposed shoulders, of a felly member having a seat for said demountable rim and coöperating shoulders for engaging and locking said opposed shoulders from separation.

7. The combination with a transversely-split demountable rim having a tire-retaining flange at the side thereof, of shoulders on said flange on opposite sides of the split, and a felly member having a seat for said demountable rim and coöperating shoulders for engaging and locking said first-mentioned shoulders from separation.

In testimony whereof I affix my signature in the presence of two witnesses.

WILLIAM N. BOOTH.

Witnesses:
  JAMES P. BARRY,
  ADELAIDE F. ADAMS.